Figure 1:
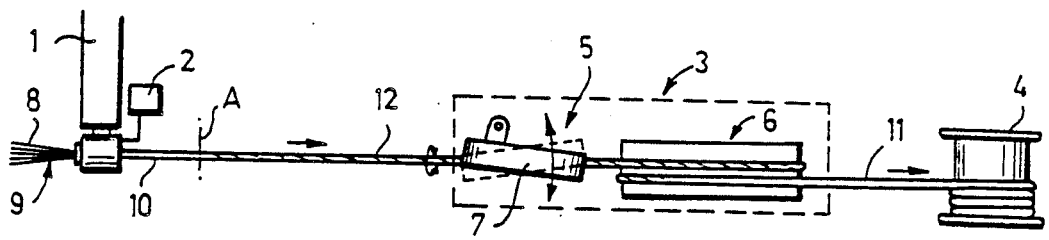

United States Patent [19]

Päivinen et al.

[11] Patent Number: 5,092,117
[45] Date of Patent: Mar. 3, 1992

[54] METHOD OF AND AN APPARATUS FOR PRODUCING AN OPTICAL MULTI-FIBER CABLE ELEMENT

[75] Inventors: Teuvo Päivinen, Lahela; Jouko Heikkilä, Helsinki, both of Finland

[73] Assignee: Nokia-Maillefer Holding S. A., Ecublens, Switzerland

[21] Appl. No.: 598,275

[22] Filed: Oct. 16, 1990

[30] Foreign Application Priority Data

Oct. 20, 1989 [FI] Finland .................. 895001

[51] Int. Cl.⁵ .................. D01H 13/30; D01H 7/92; D02G 1/04; D02G 1/08
[52] U.S. Cl. .................. 57/293; 57/295; 57/336; 57/335; 57/344
[58] Field of Search .................. 57/7, 13, 12, 309, 310, 57/295, 296, 232, 210, 249, 293, 335, 336, 344

[56] References Cited

U.S. PATENT DOCUMENTS

| | | | |
|---|---|---|---|
| 3,491,525 | 1/1970 | Sugi | 57/294 |
| 3,921,381 | 11/1975 | Vogelsberg | 57/294 |
| 4,171,609 | 10/1979 | Feese | 57/295 X |
| 4,342,190 | 8/1982 | Ziemek et al. | 57/294 X |
| 4,446,686 | 5/1984 | Panuska et al. | 57/7 X |
| 4,757,675 | 7/1988 | Oglesby et al. | 57/13 X |
| 4,814,116 | 3/1989 | Oestreich et al. | 264/174 X |
| 4,826,278 | 5/1989 | Gartside, III et al. | 57/7 X |
| 4,971,419 | 11/1990 | Gartside et al. | 57/7 X |
| 4,974,408 | 12/1990 | Karhu | 57/294 X |

Primary Examiner—Joseph J. Hail, III
Assistant Examiner—Michael R. Mansen
Attorney, Agent, or Firm—Finnegan, Henderson, Farabow, Garrett & Dunner

[57] ABSTRACT

A method and apparatus for producing an optical multi-fiber cable element provided with a second sheathing by extruding a loose secondary sheathing around a fiber bundle and stretching the fibers a desired extra length with respect to the sheathing, the fibers being guided in such a manner that the position of the fibers varies continuously during stretching. To produce an untwisted cable element and avoid variation in the fiber length, the secondary sheathing together with its fiber bundle is twisted around its axis after the extrusion or the sheathing to vary the twisting position of the fiber bundle as the sheathing and fibers approach the stretching step.

10 Claims, 2 Drawing Sheets

METHOD OF AND AN APPARATUS FOR PRODUCING AN OPTICAL MULTI-FIBER CABLE ELEMENT

This invention relates to a method of producing an optical multi-fibre cable element provided with a secondary sheathing, comprising
- extruding a loose secondary sheathing around a fibre bundle of several optical fibres;
- introducing a grease filling into the secondary sheathing, said grease filling allowing the fibres to move axially with respect to each other within the secondary sheathing;
- providing the fibres with a desired extra length with respect to the secondary sheathing in a stretching device; and
- reeling a secondary-sheathed cable element so obtained onto a receiving reel;
- the fibres being guided in such a manner that the position of the fibres varies continuously in the stretching device providing the extra length.

In the production of a cable element comprising an optical fibre, it is important that the length of the fibre is made greater than that of the sheathing in the secondary sheathing step in order that the fibre would not be exposed to disadvantageous strains when the cable element is bent on reeling or installation.

Finnish Patent Specification 75 939 discloses one simple way of providing an extra length by stretching the secondary sheathing with a stretching device, whereby the optical fibre remains longer when the sheathing returns to its original length after the stretching. The stretching device comprises a drawing means which draws the sheathing loosely surrounding the fibre from an extruder, and a locking wheel assembly comprising an idler wheel around which the sheathing together with the fibre is passed at a speed slightly greater than at the drawing means. In the locking wheel assembly the fibre is positioned against the inside of the sheathing, so that the sheathing is stretched between the drawing means and the locking wheel while the fibre slides axially with respect to the sheathing.

In optical cable elements in which the secondary sheathing surrounds a fibre bundle of several fibres, the provision of an extra fibre length using a stretching device of the type described above causes variation in the length of the fibres as the turning radius of the fibres around the idler wheel of the locking wheel assembly varies. This is because the fibres which are passed through the extruder in parallel with each other are always passed onto the periphery of the idler wheel in the same order with respect to each other, that is, the same fibres are always positioned against the peripheral surface of the idler wheel, whereas the other fibres are always positioned upon the first-mentioned fibres, and as a consequence have a greater turning radius. As is well-known, such variation in the fibre length causes various disadvantages in the cable element.

U.S. Pat. No. 4,458,476 teaches one way of avoiding the problems caused by such variation in the fibre length in multi-fibre cable elements. In the U.S. Patent, the fibres in the fibre bundle are SZ twisted before the extrusion of the loose secondary sheathing around the fibres and before the sheathing is filled with grease, the purpose of the grease being to prevent the twisted fibres from being untwisted before the fibre bundle is surrounded with a sheathing. In the secondary-sheathed cable element the fibres remain twisted to some extent, which ensures that the fibres have a greater length than the sheathing. However, the twisting device required for realizing this kind of method makes the secondary sheathing device complicated, long and slow. In addition, it is known that some major disadvantages are caused by the twist remaining in the finished cable element. The SZ twisting creates a torque in the fibres, which results in the formation of static strains. The middle rod around which the fibres are twisted brakes the sliding of the fibres, thus increasing friction and strains, whereby the differences between the strains of individual fibres are increased with resultant variation in the fibre lengths and impairment of the technical properties of the cable element.

U.S. Pat. No. 4,205,899 teaches that the extra length of the fibres can be provided by passing the individual fibres in the fibre bundle into the extruder in a wavelike manner, whereby the fibre length in the secondary-sheathed fibre bundle is greater than the length of the sheathing. Due to the spiral-grooved spindle and the fibre control means required for realizing this method as well as the twist remaining in the fibres, this method has substantially the same disadvantages as the above-described SZ twisting method.

Finnish Patent Specification 75 940 teaches that the fibres in the fibre bundle will not be passed into the idler wheel assembly of the stretching device always in the same order with respect to each other when the order of the individual fibres in the fibre bundle which is passed into the extruder for providing it with a secondary sheathing is varied repeatedly in the step of forming the fibre bundle. In this way it is ensured that the fibres in the sheathed fibre bundle are passed into the idler wheel assembly in a continuously changing order, which compensates for the variation in the fibre length and improves the properties of the cable element. The device required for realizing the method, i.e. for varying the order of the fibres, makes the sheathing equipment relatively complicated and expensive.

The object of the present invention is to provide a method for the production of an optical multifibre cable element, which avoids the above-mentioned disadvantages and enables the fibres in the fibre bundle to be passed in parallel with each other into the extruder without any risk of the stretching device causing variation in the length of the fibres in the secondary-sheathed fibre bundle. This object is achieved by means of the method of the invention which is characterized in that
- the secondary sheathing together with its fibre bundle is twisted around its axis after the extrusion step to vary the twisting position of the fibre bundle when the sheathing enters the stretching device providing the extra length;
- the fibre bundle being twisted to such an extent that the spiral paths of the fibres in the fibre bundle are equally long in the stretching device.

The invention is based on the idea that the measures to be taken to continuously vary the order of the fibres of the fibre bundle to be passed into the stretching device providing the extra length is carried out only after the extrusion of the secondary sheathing. This enables the fibre bundle to be twisted together with the secondary sheathing, whereby the temporary twist of the sheathing and the fibre bundle is able to straighten after the stretching device on account of the fact that the direction of twisting is reversed continuously or periodically. Both the secondary sheathing and the fibre bundle are thus untwisted or substantially untwisted in the finished cable element. This offers considerable advantages over fibres remaining twisted within the secondary sheathing in cable elements. Since the fibres of the fibre bundle are positioned in a twisted state on the periphery of the idler wheel of the stretching device, the paths of the fibres are equally long, whereby no fibre is exposed to stretching with respect to the other fibres, and no differences in length occur between them.

The invention is also concerned with an apparatus for realizing the method described above. The apparatus comprises an extruder for extruding a secondary sheathing loosely around a fibre bundle of several optical fibres;

means for feeding a grease filling into the secondary sheathing, a stretching device for providing the fibres with a desired extra length with respect to the secondary sheathing; and transferring means for passing the fibres into the stretching means in such a way that the position of the fibres varies continuously in the stretching device.

The apparatus is characterized in that the transferring means for the fibres are formed by twisting means positioned after the extruder, said twisting means being arranged to twist the secondary sheathing and the fibre bundle within it around the axis of the sheathing in such a way that the fibre bundle enters the stretching device in a twisted state.

The apparatus of the invention is very simple in structure because the invention can be realized simply by modifying the existing drawing means of a stretching device comprising a drawing means and an idler wheel in such a way that it subjects the secondary sheathing to a small twisting effect. The invention does not either restrict the line speed in any way, and it can be applied both in horizontal and vertical lines.

When applying the invention in a so-called thermal biasing process (e.g. U.S. Pat. No. 4,772,435), one only has to provide a simple twisting means between the extruder of the secondary sheathing and the locking idler wheel to subject the sheathing to a periodical twisting effect.

Figure 3:
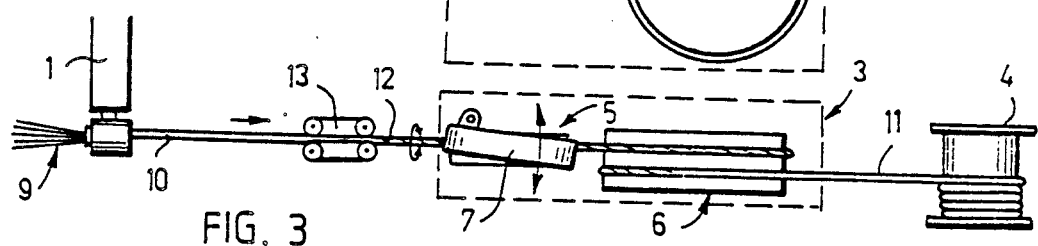
Figure 4:
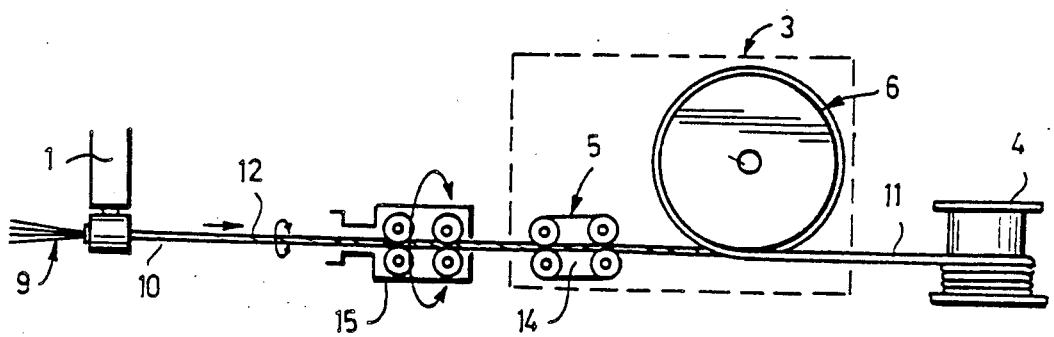
Figure 5:
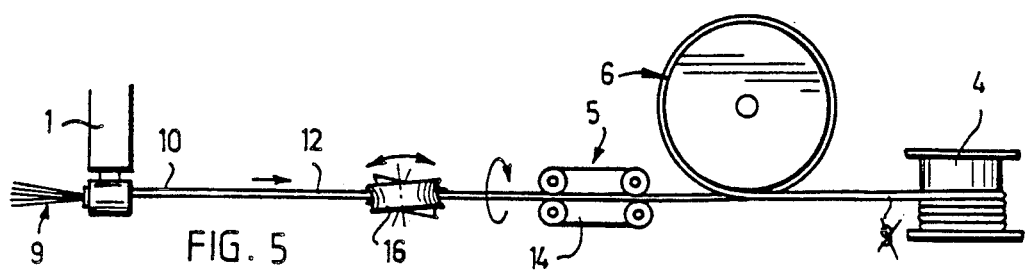
Figure 6:
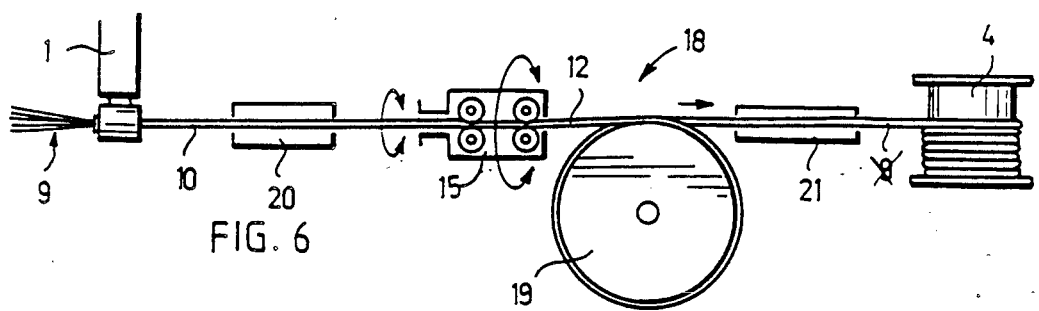
Figure 7:
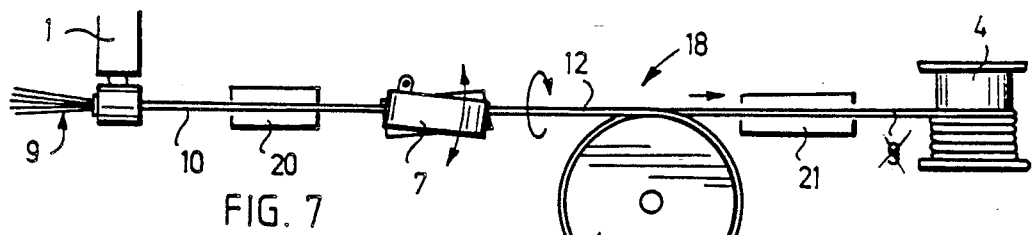
Figure 8:
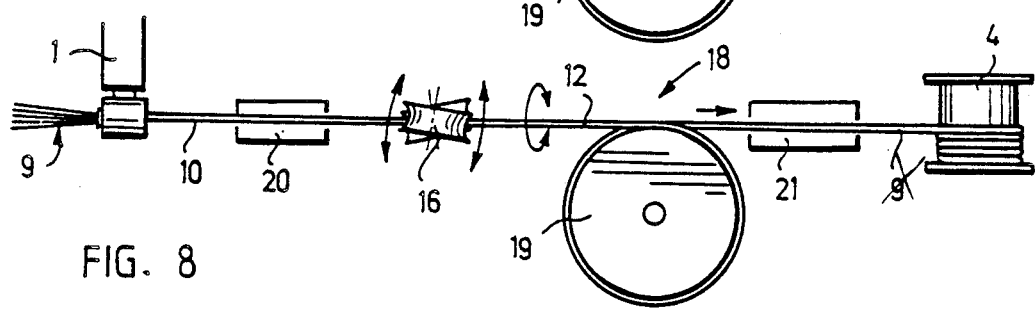

In the following the invention will be described in greater detail with reference to the attached drawings, in which FIG. 1 is a schematic top view and FIG. 2 a schematic side view of a first embodiment of the production apparatus of the invention when applied to the use of a twisting caterpillar in connection with a mechanical stretching device;

FIGS. 3 to 5 show alternative embodiments of the apparatus similarly in connection with a stretching device; and FIGS. 6 to 8 show alternative embodiments of the invention in connection with thermal biasing.

For the sake of clarity, all devices and means which are not necessary for the understanding of the invention, such as fibre feeding reels, cooling chutes for the secondary sheathing, etc., are not shown in the drawings.

Figure 2:
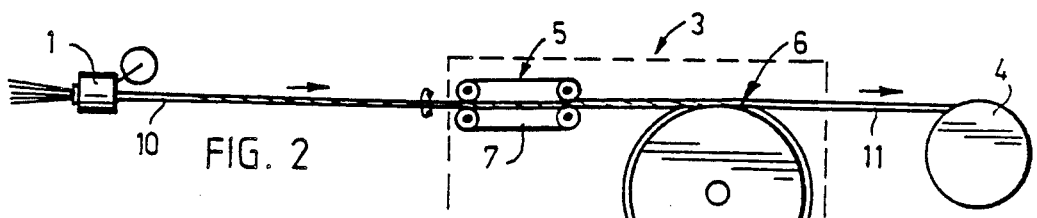

FIGS. 1 and 2 of the drawings show an extruder 1, an associated grease filling device 2, a stretching device 3 and a receiving reel 4. The stretching device comprises a drawing means 5 and an idler wheel 6 the operating machineries of which are synchronized with each other in a known manner with a small speed difference.

According to the invention the drawing means 5 of the stretching device is formed by a reversible twisting caterpillar 7 the drive belts of which are adjustable between two extreme positions in which the belts are positioned at a larger or smaller angle with respect to each other, as shown with the double arrow in FIG. 1. The drive belts move from one extreme position to the other over a middle position in which the belts are in parallel with each other and with the path of the sheathing.

To sheathe a fibre bundle 9 consisting of parallel fibres 8, it is passed through an extruder which forms a loose secondary sheathing 10 around the fibre bundle, and the sheathing is filled with grease. The drawing means draws the sheathing through it and at the same time twists the sheathing around its axis, whereby the grease filling forces the fibre bundle to follow the twisting movement of the sheathing. The sheathing then passes around the idler wheel 6 and further onto the receiving reel. On the periphery of the idler wheel, the fibre bundle is positioned against the inside of the sheathing so that the fibre bundle is locked axially immovably to the sheathing. As the drawing means simultaneously brakes the movement of the sheathing to some extent, the sheathing is stretched between the drawing means and the idler wheel while the fibres slide axially in the grease within the area of the drawing means braking the sheathing. When the stretch of the sheathing has returned after the idler wheel, the resulting cable element 11 to be reeled is in this way provided with an extra fibre length with respect to the sheathing.

Since the twisting caterpillar twists the sheathing and the fibre bundle within it, it is ensured that the position of the fibres in the fibre bundle varies continuously when the fibre bundle reaches the periphery of the idler wheel. In this way it can be ensured that the same fibres in the fibre bundle will not always turn around the idler wheel with a shorter turning radius than the other fibres, so that the fibres are equally long after the stretching step. In order that no permanent twist would be left in the sheathing, that is, to enable the sheathing to be untwisted after the idler wheel, the drive belts of the caterpillar are adjusted from one extreme position to the other either continuously or periodically back and forth. In the latter case, the sheathing with the fibre bundle is first twisted in one direction until the fibre bundle has twisted to such an extent that the fibres are about to get interlocked longitudinally unslideably with respect to each other, whereafter the drive belts are displaced from the oblique position to the middle position. In this way the fibre bundle starts to untwist gradually and when it is substantially untwisted, the drive belts are displaced to the other extreme position so that the caterpillar starts to twist the sheathing with its fibre bundle in the opposite direction. After the fibre bundle then again has been twisted close to the locking point of the fibres, the drive belts are again displaced to the middle position so that the fibre bundle starts to untwist, etc. The twist of the sheathing is straightened after the stretching device so that the fibres are completely or substantially untwisted in the sheathed cable element. The fibre bundle is twisted only to such an extent as is required to ensure that the twisted paths of the fibres in the fibre bundle will be equally long on the periphery of the idler wheel. Preferably, the fibre bundle is twisted only to such an extent that the fibres are still able to slide in the longitudinal direction with respect to each other in the twisted fibre bundle.

In the embodiment of FIGS. 1 and 2, a twist 12 created in the sheathing by the twisting caterpillar 7 advances towards the extruder. In this case, it is advantageous to adjust the twisting effect of the caterpillar so that the twist does not extend beyond a solidification limit A of the sheathing to prevent the formation of a permanent twist in the sheathing and in the fibres. Such a permanent twist, however, is not disadvantageous because the sheathing is not in a strained state. A small twist gives firmness to the fibre bundle, wherefore a small permanent twist can be left in the sheathing in some cases.

The apparatus shown in FIG. 3 represents such a situation. It deviates from the apparatus shown in FIGS. 1 and 2 mainly in that a double belt device 13 preventing the twisting of the sheathing is mounted in front of the twisting caterpillar 5 on the side of the extruder. In this way it can be accurately determined how far towards the extruder the twist created by the twisting caterpillar extends.

The apparatus shown in FIG. 4 deviates from that shown in FIGS. 1 and 2 only in that the drawing means 5 of the stretching device is an ordinary caterpillar 14 which does not cause twisting. The sheathing is twisted by means of a reversibly rotating twisting wheel assembly 15 mounted in front of the caterpillar.

The apparatus shown in FIG. 5 deviates from that shown in FIG. 4 merely in that the twisting wheel assembly 15 is replaced with a reversible twisting wheel pair 16.

In the apparatuses shown in FIGS. 6 to 8 the extra fibre length of the finished cable element is achieved by so-called thermal biasing in place of the stretching device. Accordingly, the sheathing is exposed to a controlled shrinking effect 18 by means of a locking drive wheel 19 and cooling basins 20, 21.

In the apparatus shown in FIG. 6, a reversibly rotating twisting wheel assembly 15 acting as a drawing means is mounted in front of the locking drive wheel 19. The rotating twisting wheel assembly twists the sheathing and the fibre bundle before the fibre bundle is passed onto the periphery of the locking drive wheel.

In the apparatus shown in FIG. 7, a reversible twisting caterpillar 7 acting as a drawing means is mounted in front of the locking drive wheel 19.

In the apparatus shown in FIG. 8, a reversible twisting wheel pair 16 acting as a drawing means is mounted in front of the locking drive wheel 19.

The drawings and the description related to them are only intended to illustrate the idea of the invention. In their details, the method and the apparatus of the invention may vary within the scope of the claims. If required, a twisting caterpillar or a similar device can be positioned after the device providing the extra length to untwist the sheathing.

We claim:

1. A method of producing an optical multi-fibre cable element provided with a secondary sheathing, comprising extruding (1) a loose secondary sheathing (10) around a fibre bundle (9) of several optical fibres (8);
introducing a grease filling (2) into the secondary sheathing, said grease filling allowing the fibres to move axially with respect to each other within the secondary sheathing;
providing the fibres with a desired extra length with respect to the secondary sheathing in a stretching device; and
reeling a secondary-sheathed cable element (11) so obtained onto a receiving reel (4);
the fibres being guided in such a manner that the position of the fibres varies continuously in the stretching device (3; 18) providing the extra length; characterized in that
the secondary sheathing (10) together with its fibre bundle (9) is twisted (12) around its axis after the extrusion step (1) to vary the twisting position of the fibre bundle when the sheathing enters the stretching device (3; 18) providing the extra length;
the fibre bundle being twisted to such an extent that the spiral paths of the fibres in the fibre bundle are equally long in the stretching device.

2. A method according to claim 1, characterized in that the direction of twisting of the secondary sheathing (10) and its fibre bundle (9) is reversed continuously.

3. A method according to claim 1, characterized in that the direction of twisting of the secondary sheathing (10) and its fibre bundle (9) is reversed periodically.

4. A method according to claim 1, 2 or 3, characterized in that the secondary sheathing (10) together with its fibre bundle (9) is twisted within the solidified length of the sheathing to enable the cable element (11) to be substantially untwisted.

5. An apparatus for producing an optical multifibre cable element provided with a secondary sheathing, comprising an extruder (1) for extruding a secondary sheathing (10) loosely around a fibre bundle (9) of several optical fibres (8);
means (2) for feeding a grease filling into the secondary sheathing,
a stretching device (3; 18) for providing the fibres with a desired extra length with respect to the secondary sheathing; and
transferring means (5; 15; 16) for passing the fibres into the stretching device in such a manner that the position of the fibres is varied continuously in the stretching device (3; 18); characterized in that the transferring means (5; 15; 16; 17) for the fibres (8) are formed by twisting means positioned after the extruder (1), said twisting means being arranged to twist the secondary sheathing (10) and the fibre bundle (9) within it around the axis of the sheathing in such a way that the fibre bundle enters the stretching device in a twisted state.

6. An apparatus according to claim 5, wherein said device (3) providing the extra length comprises a drawing means (5) transferring the secondary sheathing (10) in the axial direction and a subsequent means (6; 19) for locking the sheathing and the fibre bundle axially immovably together, characterized in that the drawing means (5) is a twisting caterpillar (7) which twists the axially movable secondary sheathing (10) around its axis.

7. An apparatus according to claim 6, characterized in that a means (13) preventing the secondary sheathing (10) from being twisted around its axis on the side of the extruder (1) is provided in front of the caterpillar (7).

8. An apparatus according to claim 6 or 7, characterized in that the twisting direction of the caterpillar is reversible.

9. An apparatus according to claim 5, wherein said device (3) providing the extra length comprises a drawing means (5) for transferring the secondary sheathing (10) in the axial direction and a subsequent means (6) for locking the sheathing and the fibre bundle axially immovably together, characterized in that the drawing means (5) is an untwisting caterpillar (14) and that means (15) for twisting the axially movable sheathing around its axis are provided in front of said drawing means (5).

10. An apparatus according to claim 5, wherein a means (18) providing an extra length comprises a means (19) for locking the sheathing (10) and the fibre bundle (9) axially immovably together and cooling means (20, 21) for shrinking the sheathing axially with respect to the fibre bundle, characterized by twisting means (5, 15; 16) positioned in front of the locking means (19), said twisting means twisting the axially movable sheathing around its axis.

* * * * *